Figure 1:
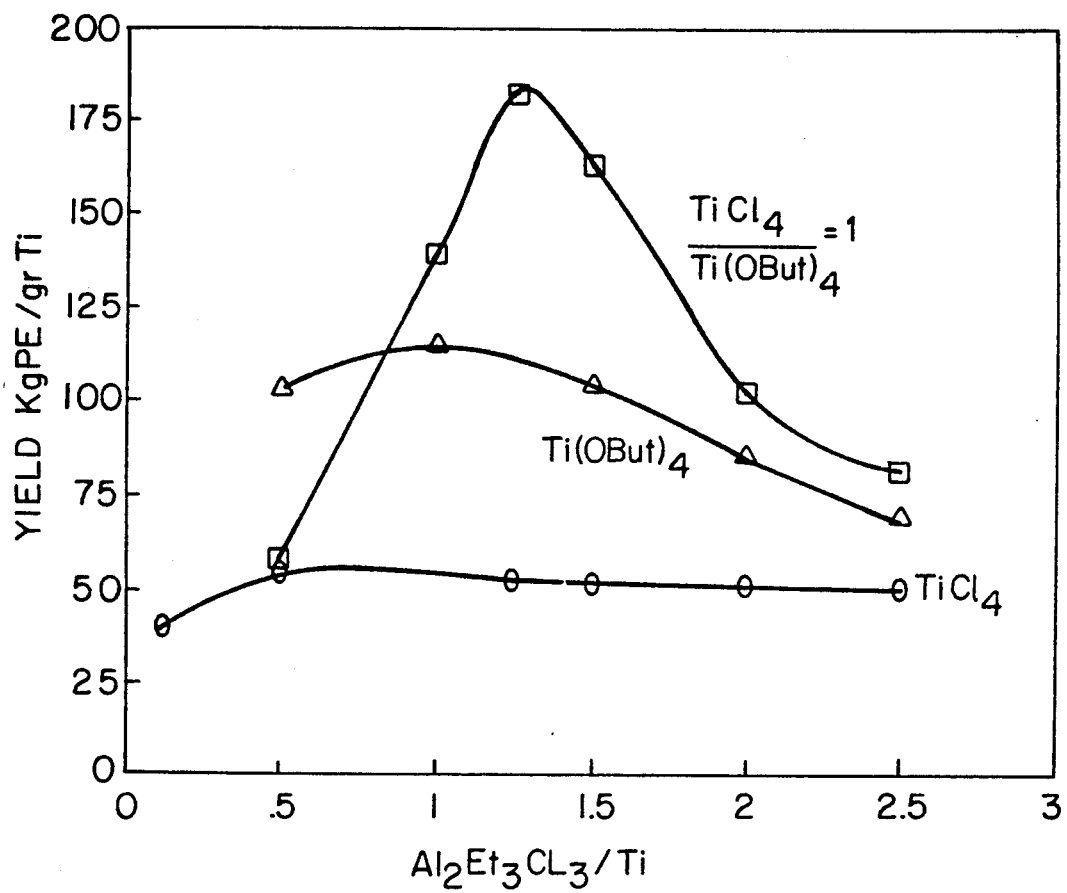

United States Patent [19]

Luciani et al.

[11] Patent Number: 5,298,474
[45] Date of Patent: Mar. 29, 1994

[54] SUPPORTED CATALYST FOR THE (CO)POLYMERIZATION OF ETHYLENE

[75] Inventors: Luciano Luciani, Ferrara; Federico Milani, S. Maria Maddalena; Renzo Invernizzi, Milan; Maddalena Pondrelli, Budrio, all of Italy

[73] Assignee: ECP Enichem Polimeri S.r.l., Milan, Italy

[21] Appl. No.: 911,419

[22] Filed: Jul. 10, 1992

[30] Foreign Application Priority Data

Jul. 12, 1991 [IT] Italy .............................. 001938 A/91

[51] Int. Cl.⁵ .............................................. C08F 4/64
[52] U.S. Cl. .................................... 502/115; 502/120; 502/127; 526/119
[58] Field of Search ......................... 502/115, 120, 127

[56] References Cited

U.S. PATENT DOCUMENTS

| 3,642,746 | 2/1972 | Kashiwa et al. | 502/124 |
| 4,421,674 | 12/1983 | Invernizzi et al. | 502/154 |
| 4,532,312 | 7/1985 | Hawley | 526/119 |
| 4,914,168 | 4/1990 | Coosemans et al. | 502/115 |
| 5,126,302 | 6/1992 | Masino | 526/125 |

FOREIGN PATENT DOCUMENTS 0463672 1/1992 European Pat. Off. .
0480435 4/1994 European Pat. Off. .

Primary Examiner—Joseph L. Schofer
Assistant Examiner—David Wu
Attorney, Agent, or Firm—Shea & Gould

[57] ABSTRACT

A solid component of catalyst for the (co)polymerization of ethylene is composed of a silica support and of a catalytically active part containing titanium, magnesium, chlorine and alkoxy groups, and is obtained by:
(i) activating a silica support by contact with a solution of magnesium dialkyl, or magnesium alkyl chloride, in a liquid, aliphatic hydrocarbon solvent;
(ii) impregnating the activated silica with a solution, in a liquid aliphatic or aromatic ester, of titanium tetrachloride and tetra-alkoxide in equimolecular or almost equimolecular quantities, and magnesium chloride; and
(iii) treating the solid obtained in step (ii) with a proportioned quantity of aluminium alkyl sesquichloride.

19 Claims, 1 Drawing Sheet

SUPPORTED CATALYST FOR THE (CO)POLYMERIZATION OF ETHYLENE

DESCRIPTION

The present invention relates to a solid component of catalyst, the procedure for its preparation and its use in processes for the polymerization of ethylene and the copolymerization of ethylene with α-olefins.

It is well-known that ethylene, or α-olefins in general, can be polymerized using the low pressure procedure on Ziegler-Natta catalysts. These catalysts are generally composed of elements from sub-groups IV to VI of the Periodic Table (compounds of transition metals), mixed with an organometallic compound, or hydride, of elements from groups I to III of the Periodic Table.

Catalysts are already known in the art, wherein the compound of the transition metal is fixed to a solid support, of an organic or inorganic nature, possibly treated physically and/or chemically. Examples of solid supports are oxygenated compounds of bivalent metals (such as oxides, oxygenated inorganic salts and carboxylates), or hydroxychlorides or chlorides of bivalent metals.

According to U.S. Pat. No. 3.642.746 a catalyst support is a halide of a bivalent metal treated with an electron donor. According to the description of U.S. Pat. No. 4.421.674 a catalyst support is the solid, free-flowing product obtained by the spray-drying of a solution of magnesium chloride in ethanol.

In particular according to U.S. Pat. No. 4.421.674 microspheroidal particles of a solid, such as silica, can be suspended in the ethanol solution of magnesium chloride to obtain a spherical catalyst support composed of the microspheroidal solid and the activated magnesium chloride. Italian Patent Application 21.711 A/90, filed on Oct. 11 1990, in the name of the Applicant, describes a solid component of catalyst obtained by impregnating a silica with a solution of magnesium chloride and titanium tetraalkoxide in an aliphatic ester solvent and treating the silica thus impregnated with an aluminium alkyl chloride.

It has now been found, according to the present invention, that it is possible to improve the activity of catalysts supported on silica by impregnating an activated silica with a solution, in a liquid ester, of magnesium chloride and an equimolecular, or almost equimolecular, mixture of titanium tetrachloride and tetraalkoxide and treating the impregnated silica with critical quantities of aluminium alkyl sesquichloride. In particular, it has been found that these components of catalysts have a surprisingly high activity in procedures for the (co)polymerization of ethylene and are capable of producing (co)polymers in the form of free-flowing pellets having an excellent rheology.

In accordance with this, the present invention relates to a solid component of catalyst for the (co)polymerization of ethylene, composed of a support of silica in small particles (50-90% by weight) and a catalytically active part (50-10% by weight) containing titanium, magnesium, chlorine, aluminium and alkoxy groups, said component being obtained by:

(i) activating a silica support by contact with a solution of a magnesium dialkyl, or magnesium alkyl chloride, in a liquid aliphatic hydrocarbon solvent;

(ii) impregnating the silica thus activated with a solution, in a liquid aliphatic or aromatic ester, of magnesium chloride and titanium tetrachloride and tetra-alkoxide, operating with equimolecular, or almost equimolecular, quantities of titanium tetrachloride and tetraalkoxide and with a molar ratio between the magnesium chloride and titanium compounds of 1 to 10;

(iii) treating the impregnated silica by contact with aluminium alkyl sesquichloride, operating with a molar ratio between the aluminum alkyl sesquichloride and the titanium compounds of 0.9:1 to 1.9:1; and (iv) recovering the solid component of catalyst from the reaction products of step (iii).

Silica which is suitable as a catalyst support is preferably a microspheroidal silica (particle size 20-100 μm) having a BET surface area of 150 to 400 m$^2$/g, a total porosity of >80% and an average pore radius of 50 to 200 Å.

According to the procedure of the present invention this silica is activated in step (i) by contact with a solution of a magnesium dialkyl, or magnesium alkyl chloride, in a liquid aliphatic hydrocarbon solvent. The magnesium dialkyls suitable for the purpose are compounds which can be defined with the formula MgR'R'', wherein R' and R'', the same or different, each independently represent an alkyl group, either linear or branched, containing from 1 to 10 carbon atoms. Specific examples of magnesium dialkyl are: magnesium diethyl, magnesium ethyl butyl, magnesium dihexyl, magnesium butyl octyl, and magnesium dioctyl. The corresponding halides, for example chlorides, of magnesium alkyl may also be used. Hydrocarbon solvents suitable for the impregnation may be selected from pentane, isopentane, hexane, heptane or octane. It is convenient to operate with a quantity of magnesium dialkyl or halide of magnesium alkyl ranging from 10 to 25 parts by weight for every 100 parts by weight of silica.

Step (i) is carried out by putting the silica in contact with the solution of magnesium dialkyl or halide of magnesium alkyl, in the selected hydrocarbon solvent, operating at a temperature ranging from 40° to 100° C., for a period of 0.5 to 2 hours and preferably at a temperature of about 60° C., for 1 hour. At the end of the treatment the activated silica is recovered for example by filtration or decantation.

In step (ii) the activated silica is put in contact with a solution, in a liquid aliphatic or aromatic ester, of magnesium chloride and titanium tetrachloride and tetraalkoxide, the latter being in equimolecular, or almost equimolecular quantities. The titanium tetra-alkoxides Ti(OR)$_4$ may be selected from titanium tetra n-propoxide, titanium tetra n-butoxide, titanium tetra i-propoxide and titanium tetra i-butoxide. The magnesium chloride used for the purpose is an anhydrous or substantially anhydrous magnesium chloride (water content lower than 1% by weight). Esters suitable as solvents may be selected from the methyl or ethyl esters of lower aliphatic carboxylic acids, chlorinated or not chlorinated, or of benzoic acid, such as ethyl formate, methyl acetate, ethyl acetate, propyl acetate, isopropyl acetate, ethyl chloroacetate, methyl benzoate and ethyl benzoate. The preferred solvent is ethyl acetate.

In step (ii) of the procedure the magnesium chloride and titanium tetrachloride and tetra-alkoxide, in the proportions indicated above, are dissolved in the selected ester, operating at temperatures higher than the values of room temperature to facilitate the solubilization. The activated silica is impregnated with the solution thus obtained operating at a temperature ranging from 50° to 100° C., for a period of 0.5 to 2 hours, and preferably at a temperature of 70° C., for 1 hour. At the end of the treatment the impregnated silica is recovered by vapourizing the solvent at reduced pressure.

In accordance with the present invention, the impregnated silica is treated with a solution of aluminium alkyl sesquichloride in a hydrocarbon solvent, to obtain a highly active solid component of catalyst. The solvents may be selected from the liquid aliphatic hydrocarbons mentioned in the description of step (i). More specifically, the impregnated silica of step (ii) is put in contact with a solution of aluminium alkyl sesquichloride, especially aluminium ethyl sesquichloride, operating at a temperature ranging from 10° to 100° C., for a period, depending on the temperature used, varying from 10 minutes to 24 hours. In the preferred embodiment the operating temperature ranges from 20° to 90° C., for a period ranging from 15 minutes to 2 hours. It is even more preferable to operate at 60°-70° C. for 1 hour.

In the present invention the quantity of sesquichloride used in step (iii) is critical in view of the activity of the solid component of catalyst in the polymerization.

FIG. 1 shows (in ordinate) the typical behavior of the yield in polyethylene, expressed in kilograms of polyethylene/gram Ti, in relation to the molar ratio (in abscissa) aluminium ethyl sesquichloride/Ti in step (iii), operating in a comparative way, using as a titanium component:
  only titanium tetrachloride;
  only titanium tetra-alkoxide; and
  an equimolecular mixture of titanium tetrachloride and titanium tetra-alkoxide.

It can be noted that there is a synergetic effect with the use of the equimolecular mixture of the titanium compounds when the molar ratio sesquichloride/Ti in step (iii) varies from 0.9:1 to 2.0:1 and preferably from 1.1:1 to 1.7:1, with excellent values from 1.2:1 to 1.3:1.

At the end of the treatment, in step (iv), the solid component of catalyst is recovered and conveniently washed with a liquid aliphatic hydrocarbon solvent, until the chlorides have disappeared from the washing liquid, and possibly dried.

The solid component of catalyst of the present invention is a granular solid composed of a support of silica in small particles (50–90% by weight) and a catalytically active part (50–10% by weight) containing titanium, magnesium, chlorine, aluminium and alkoxy groups. In the preferred method this component of catalyst contains 3–5% by weight of titanium, 3–5% by weight of magnesium, 15–20% by weight of chlorine, 1–5% by weight of aluminium, and 10–50% of the titanium is in the form of trivalent titanium, the remaining being in the form of tetravalent titanium.

The present invention also relates to a catalyst for the (co)polymerization of ethylene composed of the solid component of catalyst, described above, and a co-catalyst preferably selected from aluminium trialkyls, alkyl aluminium hydrides, and halides (preferably chlorides) of aluminium alkyl, containing from 1 to 5 carbon atoms in the alkyl portion. Among these, aluminium trialkyls are preferred with from 2 to 4 carbon atoms in the alkyl portion, such as aluminium triethyl, aluminium tributyl and aluminium triisobutyl.

The catalysts of the present invention have an atomic ratio between the aluminium, in the co-catalyst, and the titanium, in the solid component of catalyst, which generally varies from 1 to 500 and preferably from 50 to 200.

The present invention also relates to a procedure for the (co)polymerization of ethylene using the catalyst described above. The α-olefins which can be copolymerized with ethylene are preferably propylene and 1-butene and the polymerization procedure can be carried out in suspension in an inert diluent, or in the gaseous phase, in a fluidized or stirred bed. The general polymerization conditions are: temperature from 50° to 110° C., total pressure from 5 to 40 bar, with a ratio between the partial hydrogen and ethylene pressures of 0 to 10. In all cases a high productivity in the olefinic polymer is obtained, the latter having an excellent rheology and being, in particular, in the form of not-friable pellets (with a size of generally 2,000–125 μm), and without fines.

The experimental examples which follow provide a better illustration of the present invention. In these examples a microspheroidal silica is used as the support of the solid component in catalyst, in particles with an average diameter of 40 μm and having the following characteristics:
  apparent density: 0.21 g/ml
  surface area (BET): 320 m$^2$/g
  pore volume: 1.6 ml/g
  average pore diameter: 25 Å

EXAMPLE 1

(i) 20 ml (17.5 mmoles) of 20% by weight $Mg(C_4H_9)_{1.5}(C_8H_{17})_{0.5}$ in n-heptane and 17 g of silica are charged, in a nitrogen atmosphere, into a 500 ml flask, equipped with a reflux cooler, mechanical stirrer and thermometer. The mixture is heated to 60° C. for 1 hour under stirring and the activated silica is then recovered by filtration.

(ii) 220 ml ethyl acetate, 4.96 g (14.6 mmoles) of titanium tetra n-butoxide, 1.6 ml (14.5 mmoles) of titanium tetrachloride and 2.79 g (29.4 mmoles) of magnesium chloride are charged, in a nitrogen atmosphere, into another 500 ml flask, equipped with a reflux cooler, mechanical stirrer and thermometer. The mixture is heated to reflux temperature (about 75° C.) for 1 hour until the magnesium chloride has completely dissolved. The activated silica is then added to the solution thus obtained as described in (ii). Contact is left for 1 hour at 70° C. and the solution is then dried by evaporating the solvent.

(iii) The impregnated silica thus obtained is suspended in 300 ml of n-hexane and 8.81 g (35.6 mmoles) of aluminium ethyl sesquichloride are added to the suspension, at a temperature of 25° C. The temperature is brought to 66° C. and the suspension is left to react for 1 hour.

(iv) At the end of this period the solid is recovered from the suspension, washed with anhydrous n-hexane until the chlorides have disappeared from the washing liquid, and finally dried.

28 g of a solid component of catalyst are obtained in the form of a microspheroidal solid, containing 4.3% by weight of titanium (19% of which is in the form of trivalent titanium), 3.8% by weight of magnesium, 18.4% by weight of chlorine and 2.2% by weight of aluminium.

EXAMPLE 2 (COMPARATIVE)

Example 1 is repeated with the difference that in step (iii) 1.40 g of aluminium ethyl sesquichloride are used.

28.4 g of a component of catalyst are thus obtained in the form of a microspheroidal solid, containing 4.25% by weight of titanium (12% of which is in the form of trivalent titanium), 3.9% by weight of magnesium, 17% by weight of chlorine and 1.8% by weight of aluminium.

EXAMPLE 3

Example 1 is repeated with the difference that in step (iii) 13.2 g of aluminium ethyl sesquichloride are used.

28.0 g of a component of catalyst are thus obtained in the form of a microspheroidal solid, containing 4.34 by weight of titanium ( 38% of which is in the form of trivalent titanium), 3.4% by weight of magnesium, 19.3% by weight of chlorine and 3.5% by weight of aluminium.

EXAMPLE 4 (COMPARATIVE)

Example 1 is repeated with the difference that in step (ii) 9.92 g (29.1 mmoles) of titanium tetra n-butoxide are used and titanium tetrachloride is not added.

28.5 g of a component of catalyst are thus obtained in the form of a microspheroidal solid, containing 3.7% by weight of titanium (43% of which is in the form of trivalent titanium), 3.8% by weight of magnesium, 12.4% by weight of chlorine and 1.7% by weight of aluminium.

EXAMPLE 5 (COMPARATIVE)

Example 1 is repeated with the difference that in step (ii) 9.92 g (29.1 mmoles) of titanium tetra n-butoxide are used and titanium tetrachloride is not added and in step (iii) 17.6 g (71.2 mmoles) of aluminium ethyl sesquichloride are used.

26.6 g of a component of catalyst are thus obtained in a microspheroidal form, containing 4.4% by weight of titanium (51% of which is in the form of trivalent titanium), 3.7% by weight of magnesium, 19.7% by weight of chlorine and 3.2% by weight of aluminium.

EXAMPLE 6 (COMPARATIVE)

Example 1 is repeated with the difference that in step (ii) 5.50 g (29.0 mmoles) of titanium tetrachloride are used and titanium tetra n-butoxide is not added and in step (iii) 3.03 g (12.3 mmoles) of aluminium ethyl sesquichloride are used.

28.2 g of a component of catalyst are thus obtained in the form of a microspheroidal solid, containing 4.2% by weight of titanium (24% of which is in the form of trivalent titanium), 3.5% by weight of magnesium, 17% by weight of chlorine and 2.1% by weight of aluminium.

EXAMPLE 7 (COMPARATIVE)

Example 1 is repeated with the difference that in step (ii) 5.50 g (29.0 mmoles) of titanium tetrachloride are used and titanium tetra n-butoxide is not added and in step (iii) the treatment with aluminium ethyl sesquichloride is omitted.

23.3 g of a component of catalyst are thus obtained in the form of a microspheroidal solid, containing 4.4% by weight of titanium (100% in tetravalent form), 3.8% by weight of magnesium and 13.7% by weight of chlorine.

EXAMPLE 8 (COMPARATIVE)

Example 1 is repeated with the difference that in step (ii) 5.50 g (29.0 mmoles) of titanium tetrachloride are used and titanium tetra n-butoxide is not added and in step (iii) 6.03 g of aluminium ethyl sesquichloride are used.

24 g of a component of catalyst are thus obtained in the form of a microspheroidal solid, containing 4.1% by weight of titanium (35% of which is in the form of trivalent titanium), 3.6% by weight of magnesium, 19.4% by weight of chlorine and 2.4% by weight of aluminium.

EXAMPLE 9

The solid components of catalyst prepared in Examples 1-8 (tests 1-8) are used in polymerization tests of ethylene. More specifically, the polymerization is carried out in an autoclave having a volume of 5 liters containing 2 liters of n-hexane. The operating pressure is 15 bar in the presence of hydrogen, with a ratio between the hydrogen and ethylene pressure of 0.47/1, or 0.64/1, at a temperature of 90° C. and with a time of 1.5 hours, using aluminum triethyl as a co-catalyst, with a molar ratio between the aluminium triethyl and the titanium in the solid component of 50/1. Tests 9–11 are carried out with the solid component of catalyst of Example 1, but using a polymerization time of 3 hours.

Table 1 below shows, for each test, the ratio (RP) between the hydrogen pressure and the ethylene pressure; the yield (Yield) in polyethylene expressed in kg of polyethylene per g of solid component of catalyst; the yield with respect to the titanium (R/Ti) expressed in kg of polyethylene per gram of titanium in the solid component of catalyst; the density (D) of the polymer (ASTM D 1505) expressed in g/ml; the melt-flow index (MFI) of the polymer (ASTM D 1238; 2.16 kg and 21.6 kg) expressed in g/10 minutes; and the apparent density (AD) of the polymer (ASTM D 1895) expressed in g/ml.

Table 2 shows the particle size distribution expressed in $\mu$m, in % by weight of the polyethylenes obtained in the polymerization tests indicated in Table 1.

TABLE 1

| Test | RP | Yield | R/Ti | D | MFI (2.16) | MFI(21.6) | AD |
|---|---|---|---|---|---|---|---|
| 1 | 0.47 | 7.9 | 184 | 0.9627 | 6.5 | 208 | 0.36 |
| 2 | 0.47 | 1.85 | 44 | 0.9593 | 1.15 | 34.4 | 0.35 |
| 3 | 0.64 | 3.0 | 70 | 0.9665 | 7.0 | 160 | 0.32 |
| 4 | 0.47 | 4.2 | 113 | 0.9630 | 2.7 | 78.3 | 0.34 |
| 5 | 0.64 | 2.8 | 65 | 0.9641 | 4.8 | 137 | 0.36 |
| 6 | 0.64 | 2.2 | 53 | 0.9618 | 3.5 | 104 | 0.33 |
| 7 | 0.47 | 0.75 | 17 | 0.9545 | 0.82 | 25.9 | 0.34 |
| 8 | 0.64 | 2.0 | 48 | 0.9635 | 4.0 | 116 | 0.33 |
| 9 | 0.96 | 7.0 | 163 | 0.9673 | 32.8 | ND | 0.35 |
| 10 | 0.30 | 18.1 | 420 | 0.9638 | 4.1 | 129.7 | 0.39 |
| 11 | 0.21 | 27.4 | 794 | 0.9588 | 0.68 | 25.2 | 0.37 |

ND = not determined

TABLE 2

| Test N. | Particle size ($\mu$m) | | | | | |
|---|---|---|---|---|---|---|
| | >2000 | 2000<>1000 | 1000<>500 | 500<>250 | 250<>125 | <125 |
| 1 | 0.2 | 42.9 | 42.8 | 9.1 | 2.8 | 2.2 |
| 2 | 0.0 | 1.1 | 45.2 | 41.6 | 8.6 | 3.5 |
| 3 | 0.1 | 4.5 | 61.5 | 31.5 | 2.0 | 0.4 |
| 4 | 0.0 | 6.6 | 63.2 | 24.1 | 3.1 | 3.0 |
| 5 | 1.4 | 3.2 | 55.8 | 32.7 | 5.4 | 1.5 |
| 6 | 0.0 | 0.9 | 59.6 | 34.2 | 4.1 | 1.2 |
| 7 | 0.1 | 1.2 | 20.8 | 58.4 | 14.8 | 4.7 |
| 8 | 0.1 | 1.0 | 58.9 | 35.8 | 3.1 | 1.1 |
| 9 | 0.0 | 27.9 | 63.2 | 8.4 | 0.3 | 0.2 |
| 10 | 0.2 | 42.9 | 42.8 | 9.1 | 2.8 | 2.2 |
| 11 | 3.8 | 65.1 | 28.2 | 2.5 | 0.2 | 0.2 |

We claim:

1. Solid component of catalyst for the (co)polymerization of ethylene, comprised of a support of silica in small particles (50–90% by weight) and a catalytically active part (50–10% by weight) containing titanium, magnesium, chlorine, aluminium and alkoxy groups, obtained by:
   (i) activating a silica support by contact with a solution of magnesium dialkyl, or magnesium alkyl chloride, in a liquid aliphatic hydrocarbon solvent;
   (ii) impregnating the silica thus activated with a solution, in a liquid aliphatic or aromatic ester, of magnesium chloride and titanium tetrachloride and titanium tetra-alkoxide, operating with equimolecular, or almost equimolecular quantities of titanium tetrachloride and titanium tetra-alkoxide and with a molar ratio between the magnesium chloride and the titanium compounds of 1 to 10;
   (iii) treating the impregnated silica by contact with aluminium alkyl sesquichloride, operating with a molar ratio between the titanium compounds and the aluminium alkyl sesquichloride of 0.9:1 to 1.9:1; and
   (iv) recovering the solid component of catalyst from the reaction products of step (iii).

2. Solid component of catalyst according to claim 1, wherein in step (i) the silica suitable as a catalyst support is a microspheroidal silica (particle size 20–100 μm) having a surface area BET of 150 to 400 $m^2/g$, a total porosity of >80% and an average pore radius of 50 to 200 Å.

3. Solid component of catalyst according to claim 1, wherein in step (i) the magnesium dialkyl is selected from compounds which can be defined with the formula MgR'R'', wherein R' and R'', the same or different, each independently represent an alkyl group, linear or branched, containing from 1 to 10 carbon atoms.

4. Solid component of catalyst according to claim 1, wherein in step (i) the magnesium dialkyl or magnesium alkyl chloride is in a hydrocarbon solvent selected from pentane, isopentane, hexane, heptane and octane, at a temperature ranging from 40° to 100° C., for times ranging from 0.5 to 2 hours.

5. Solid component of catalyst according to claim 1, wherein in step (ii) the titanium tetra-alkoxide is selected from titanium tetra n-propoxide, titanium tetra n-butoxide, titanium tetra i-propoxide and titanium tetra i-butoxide.

6. Solid component of catalyst according to claim 1, wherein in step (ii) an ester is used selected from methyl and ethyl esters of lower aliphatic carboxylic acids, chlorinated or not chlorinated, or from benzoic acid.

7. Solid component of catalyst according to claim 1, wherein in step (ii) the operating temperature ranges from 50° to 100° C., and the times vary from 0.5 to 2 hours and 8. Solid component of catalyst according to claim 1, wherein step (iii) is carried out with a solution of aluminium alkyl sesquichloride in a hydrocarbon solvent operating at a temperature ranging from 10° to 100° C., and for a time varying from 10 minutes to 24 hours.

9. Solid component of catalyst according to claim 1, containing 3–5% by weight of titanium, 3–5% by weight of magnesium, 15–20% by weight of chlorine, 1–5% by weight of aluminium, and 10–50% of the titanium being in its trivalent form, the remaining being in its tetravalent form.

10. Catalyst for the (co)polymerization of ethylene comprised of the solid component of catalyst according to claim 1 and of a co-catalyst aluminium trialkyl, alkyl aluminium hydride or aluminium alkyl halide.

11. A solid component of catalyst according to claim 3, wherein the magnesium dialkyl is selected from magnesium diethyl, magnesium ethyl butyl, magnesium dihexyl, magnesium butyl octyl, and magnesium dioctyl.

12. A solid component of catalyst according to claim 4, wherein in step (i) the temperature is about 60° C. and the time is about 1 hour.

13. A solid component of catalyst according to claim 6, wherein the ester is selected from ethyl formate, methyl acetate, ethyl acetate, propyl acetate, isopropyl acetate, ethyl chloroacetate, methyl benzoate and ethyl benzoate.

14. A solid component of catalyst according to claim 6, wherein the ester is ethyl acetate.

15. A solid component of catalyst according to claim 7, wherein in step (ii) the operating temperature is about 70° C. and the time is about 1 hour.

16. A solid component of catalyst according to claim 8, wherein step (iii) is carried out at a temperature of from 20° to 90° C. and for a time of 15 minutes to 2 hours.

17. A solid component catalyst according to claim 8, wherein step (iii) is carried out at a temperature of from 60° to 70° C. for about 1 hour.

18. A solid component catalyst according to claim 8, wherein the molar ratio of aluminum sesquichloride/titanium is from 1.1:1 to 1.7:1.

19. A solid component catalyst according to claim 8, wherein the molar ratio of aluminum sesquichloride/titanium ranges from 1.2:1 to 1.3:1.

* * * * *